(12) United States Patent
Mitchell et al.

(10) Patent No.: US 6,606,418 B2
(45) Date of Patent: Aug. 12, 2003

(54) ENHANCED COMPRESSION OF DOCUMENTS

(75) Inventors: Joan L. Mitchell, Longmont, CO (US); Ravi Prakash, Concord, NC (US); David A. Stepneski, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 09/760,383

(22) Filed: Jan. 16, 2001

(65) Prior Publication Data

US 2002/0094127 A1 Jul. 18, 2002

(51) Int. Cl.[7] .................................................. G06K 9/36
(52) U.S. Cl. ........................................ 382/251; 382/250
(58) Field of Search ................................ 382/168–169, 382/232, 233, 239, 252, 248, 250–251, 254, 298–299; 358/426.01, 426.02–426.04, 261.1–261.3, 430–433, 426.05–426.07, 426.14; 375/240.03, 240.18–240.25

(56) References Cited

U.S. PATENT DOCUMENTS

| | | | | |
|---|---|---|---|---|
| 5,339,368 A | * | 8/1994 | Higgins-Luthman et al. | 382/169 |
| 5,629,778 A | * | 5/1997 | Reuman | 382/252 |
| 5,850,484 A | * | 12/1998 | Berretta et al. | 382/250 |
| 6,002,796 A | * | 12/1999 | Kawa et al. | 382/168 |
| 6,047,089 A | * | 4/2000 | Abe | 382/250 |

FOREIGN PATENT DOCUMENTS

EP 0 987 902 A2 * 9/1999 ............ H04N/7/50

* cited by examiner

Primary Examiner—Leo Boudreau
Assistant Examiner—Ishrat Sherali
(74) Attorney, Agent, or Firm—Whitham, Curtis & Christofferson, P.C.; William H. Steinberg

(57) ABSTRACT

Increased and potentially extreme compression of documents is achieved by reducing/remapping the dynamic range of the document image possibly together with further image analysis and pre-processing and storing the document together with a substituted table of values chosen to restore or enhance the dynamic range of the document image. Increased or extreme compression is provided notwithstanding multiple image tones (e.g. colors or grey scale levels) even at low contrast within a document, such as a personal check. Such increased compression allows document images to be maintained in rapid-access memory for extended periods without increased storage costs.

14 Claims, 18 Drawing Sheets

JPEG: STILL IMAGE DATA COMPRESSION STANDARD

```
FFD8
FFDB  00 84 00 10 0B 0C DE DC 0A 10 0E 0D 0E 12 11 10
      13 18 28 1A 18 16 16 18 31 23 25 1D 2B 3A 33 3D
      3C 39 33 38 37 40 48 5C 4E 40 44 57 45 37 38 50
      6D 51 57 5F 62 67 68 67 3E 4D 71 79 70 64 78 5C
      65 67 63 01 11 12 12 18 15 18 2F 1A 1A 2F 63 42
      38 42 63 63 63 63 63 63 63 63 63 63 63 63 63 63
      63 63 63 63 63 63 63 63 63 63 63 63 63 63 63 63
      63 63 63 63 63 63 63 63 63 63 63 63 63 63 63 63
      63 63 63 63
FFC0  00 11 08 02 40 02 D0 03 01 21 00 02 11 01 03 11
      01
FFC4  01 A2 00 00 01 05 01 01 01 01 01 01 00 00 00 00
      00 00 00 00 01 02 03 04 05 06 07 08 09 0A 0B 10
      00 02 01 03 03 02 04 03 05 05 04 04 00 00 01 7D
      01 02 03 00 04 11 05 12 21 31 41 06 13 51 61 07
      22 71 14 32 81 91 A1 08 23 42 B1 C1 15 52 D1 F0
      24 33 62 72 82 09 0A 16 17 18 19 1A 25 26 27 28
      29 2A 34 35 36 37 38 39 3A 43 44 45 46 47 49 49
      4A 53 54 55 56 57 58 59 5A 63 64 65 66 67 68 69
      6A 73 74 75 76 77 78 79 7A 83 84 85 86 87 88 89
      8A 92 93 94 95 96 97 98 99 9A A2 A3 A4 A5 A6 A7
      A8 A9 AA B2 B3 B4 B5 B6 B7 B8 B9 BA C2 C3 C4 C5
      C6 C7 C8 C9 CA D2 D3 D4 D5 D6 D7 D8 D9 DA E1 E2
      E3 E4 E5 E6 E7 E8 E9 EA F1 F2 F3 F4 F5 F6 F7 F8
      F9 FA 01 00 03 01 01 01 01 01 01 01 01 00 00
      00 00 00 00 01 02 03 04 05 06 07 08 09 0A 0B 11
      00 02 01 02 04 04 03 04 07 05 04 04 00 01 02 77
      00 01 02 03 11 04 05 21 31 06 12 41 51 07 61 71
      13 22 32 81 08 14 42 91 A1 B1 C1 09 23 33 52 F0
      15 62 72 D1 0A 16 24 34 E1 25 F1 17 18 19 1A 26
      27 28 29 2A 35 36 37 38 39 3A 43 44 45 46 47 48
      49 4A 53 54 55 56 57 58 59 5A 63 64 65 66 67 68
      69 6A 73 74 75 76 77 78 79 7A 82 83 84 85 86 87
      88 89 8A 92 93 94 95 96 97 98 99 9A A2 A3 A4 A5
      A6 A7 A8 A9 AA B2 B3 B4 B5 B6 B7 B8 B9 BA C2 C3
      C4 C5 C6 C7 C8 C9 CA D2 D3 D4 D5 D8 D7 D8 D9 DA
      E2 E3 E4 E5 E6 E7 E8 E9 EA F2 F3 F4 F5 F6 F7 F8
      F9 FA
FFDA  00 0C 03 01 00 02 11 03 11 00 3F 00 ...
FFD9
```

FIG.2A

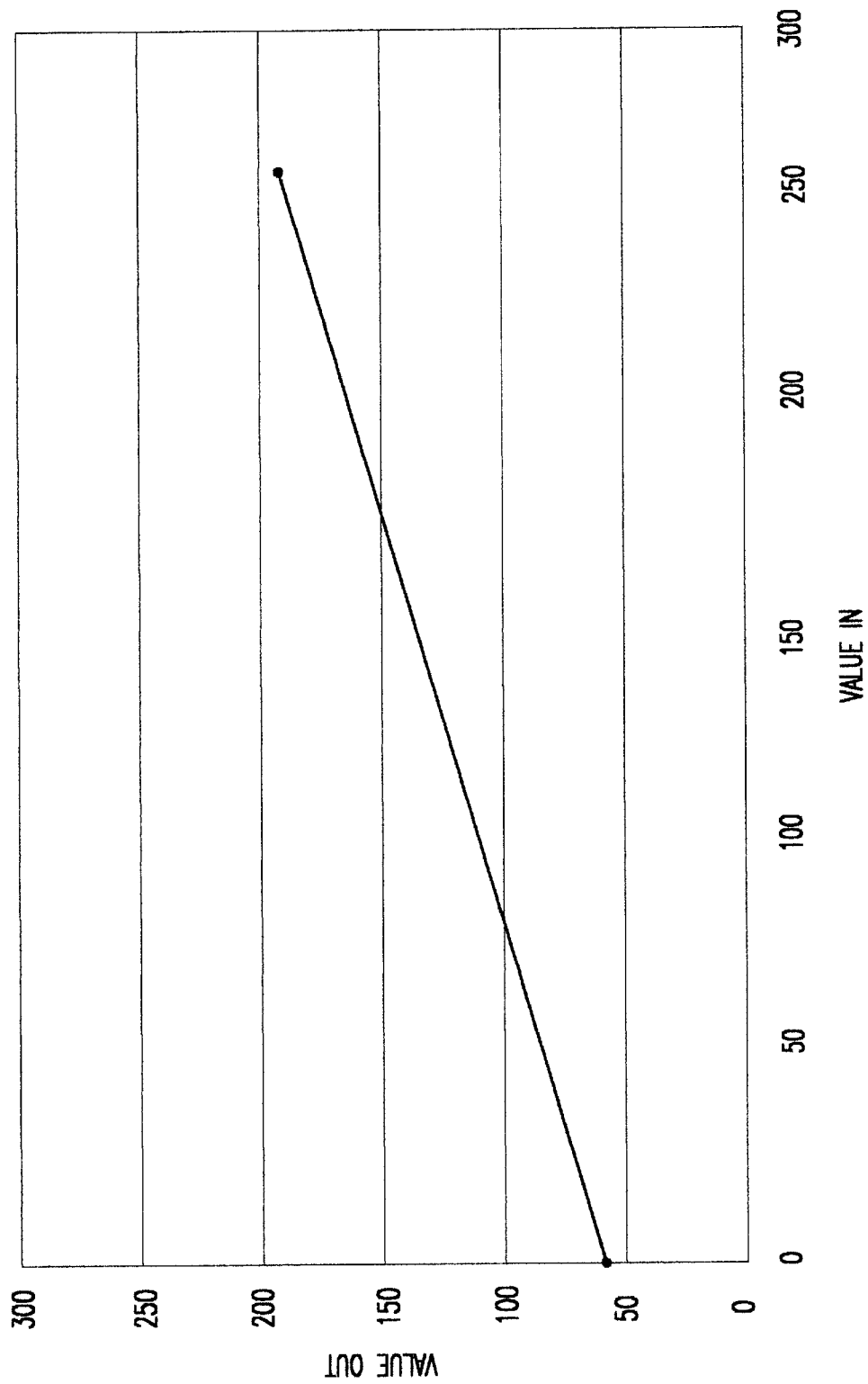

ENHANCED COMPRESSION OF DOCUMENTS

BACKGROUND OF THE INVENTION

1. Field of the Invention

The present invention generally relates to compression of data representing graphical images for transmission and/or storage and, more particularly, to extreme compression of digital images of documents.

2. Description of the Prior Art

Pictorial and graphics images contain extremely large amounts of data and, if digitized to allow transmission or processing by digital data processors, often requires many millions of bytes to represent respective pixels of the image or graphics with good fidelity. The purpose of image compression is to represent images with less data in order to save storage costs or transmission time and costs. The most effective compression is achieved by approximating the original image, rather than reproducing it exactly. The JPEG (Joint Photographic Experts Group) standard, discussed in detail in "JPEG Still Image Data Compression Standard" by Pennebaker and Mitchell, published by Van Nostrand Reinhold, 1993, which is hereby fully incorporated by reference, allows the interchange of images between diverse applications and opens up the capability to provide digital continuous-tone color images in multi-media applications.

JPEG is primarily concerned with images that have two spatial dimensions, contain gray scale or color information, and possess no temporal dependence, as distinguished from the MPEG (Moving Picture Experts Group) standard. JPEG compression can reduce the storage requirements by more than an order of magnitude and improve system response time in the process. A primary goal of the JPEG standard is to provide the maximum image fidelity for a given volume of data and/or available transmission or processing time and any arbitrary degree of data compression is accommodated. It is often the case that data compression by a factor of twenty or more (and reduction of transmission time and storage size by a comparable factor) will not produce artifacts which are noticeable to the average viewer.

Of course, other data compression techniques are possible and may produce greater degrees of image compression for certain classes of images or graphics having certain known characteristics. The JPEG standard has been fully generalized to perform substantially equally regardless of image content and to accommodate a wide variety of data compression demands. Therefore, encoders and decoders employing the JPEG standard in one or more of several versions have come into relatively widespread use and allow wide access to images for a wide variety of purposes. Standardization has also allowed reduction of costs, particularly of decoders, to permit high quality image access to be widely available. Therefore, utilization of the JPEG standard is generally preferable to other data compression techniques even though some marginal increase of efficiency might be obtained thereby, especially for particular and well-defined classes of images.

Even though such large reductions in data volume are possible, particularly using techniques in accordance with the JPEG standard, some applications require severe trade-offs between image quality and costs of data storage or transmission time. For example, there may be a need to store an image for a period of time which is a significant fraction of the useful lifetime of the storage medium or device as well as requiring a significant amount of its storage capacity. Therefore, the cost of storing an image for a given period of time can be considered as a fraction of the cost of the storage medium or device and supporting data processor installation, notwithstanding the fact that the image data could potentially be overwritten an arbitrarily large number of times. The cost of such storage is, of course, multiplied by the number of images which must be stored.

Another way to determine the storage cost versus image quality trade-off is to determine the maximum cost in storage that is acceptable and then determine, for a given amount of quality, how long the desired number of images can be saved in the available storage. This is a function of the compressed size of the images which generally relates directly to the complexity of the images and inversely with the desired reconstruction quality.

An example of such a demanding application is the storage of legal documents which must be stored for an extended period of time, if not archivally, especially negotiable instruments such as personal checks which are generated in large numbers amounting to tens of millions daily. While the initial clearing of personal checks and transfer of funds is currently performed using automated equipment and is facilitated by the use of machine readable indicia printed on the check, errors remain possible and it may be necessary to document a particular transaction for correction of an error long after the transaction of which the check formed a part.

As a practical matter, the needed quality of the image data also changes over time in such an application. For example, within a few months of the date of the document or its processing, questions of authenticity often arise, requiring image quality sufficient to, for example, authenticate a signature, while at a much later date, it may only be necessary for the image quality to be sufficient to confirm basic information about the content of the document. Therefore, the image data may be additionally compressed for longer term storage when reduced image quality becomes more tolerable, particularly in comparison with the costs of storage. At the present time, personal check images are immediately stored for archivaql purposes on write-once CD-ROM or other non-modifiable media and saved, for legal reasons, for seven years. The same data is available for only a few months in on-line, rapid-access storage.

Personal checks, in particular, present some image data compression complexities. For example, to guard against fraudulent transactions, a background pattern of greater or lesser complexity and having a range of image values is invariably provided. Some information will be printed in a highly contrasting ink, possibly of multiple colors, while other security information will be included at relatively low contrast. Decorations including a wide range of image values may be included. Additionally, hand-written or printed indicia (e.g. check amounts and signature) will be provided with image values which are not readily predictable.

Even much simpler documents may include a variety of image values such as color and shadings in letterhead, high contrast print, a watermark on the paper and a plurality of signatures. This range of image values that may be included in a document may limit the degree to which image data may be compressed when accurate image reconstruction is necessary. Therefore that cost of storage in such a form from which image reconstruction is possible with high fidelity to the original document is relatively large and such costs limit the period for which such storage is economically feasible, regardless of the desirability of maintaining such storage and the possibility of rapid electronic access for longer periods.

Since such image values must be accurately reproducible and utilization of the JPEG standard is desirable in order to accommodate widespread access and system intercompatibility, substantially the only technique for further reduction of data volume consistent with reproduction with good image fidelity is to reduce the spatial frequency of sampling of the original image. However, sampling inevitably produces aliasing and reduces legibility of small indicia, especially at low contrast. Currently, sampling at 100 dots or pixels per inch (about a reduction of one-third to one-sixth from the 300 dpi or 600 dpi resolutions of printers currently in common use) is considered to be the limit for adequate legibility of low-contrast indicia on personal checks. The American National Standards Institute (ANSI) standards committee for image interchange recommends 100 dpi as a minimum resolution. Most check applications use either 100 dpi or 120 dpi grayscale images. Lower sampling frequency also tends to increase susceptibility to image due to noise.

SUMMARY OF THE INVENTION

It is therefore an object of the present invention to provide a technique for extreme compression of digitized documents with more than two intensities with improved image fidelity.

It is another object of the invention to reduce costs of storage of compressed image data representing documents to increase the economically feasible period of storage in a form from which electronic access and adequate reproduction are possible.

It is a further object of the invention to enhance the reconstructed contrast of low-contrast documents or features therein.

It is yet another object of the invention to provide adequate or enhanced legibility of low-contrast indicia on documents.

It is another further object of the invention to extend the availability of documents from rapid-access storage without increase of storage cost.

In order to accomplish these and other objects of the invention, a method and apparatus are provided for compressing data comprising functions or steps of selecting a first quantization table, reducing the dynamic range of data, forming data of reduced dynamic range, compressing the data of reduced dynamic range with the first quantization table forming compressed data, and storing or transmitting the compressed data together with a second quantization table representing a dynamic range other than said reduced dynamic range.

BRIEF DESCRIPTION OF THE DRAWINGS

The foregoing and other objects, aspects and advantages will be better understood from the following detailed description of a preferred embodiment of the invention with reference to the drawings, in which:

FIG. 2A is an exemplary group of tables including two quantization tables in compliance with the define quantization tables (DQT) marker of the JPEG standard, FIG. 6C is a graph illustrating reducing the output range by dynamic range reduction.

DETAILED DESCRIPTION OF A PREFERRED EMBODIMENT OF THE INVENTION

Figure 1:
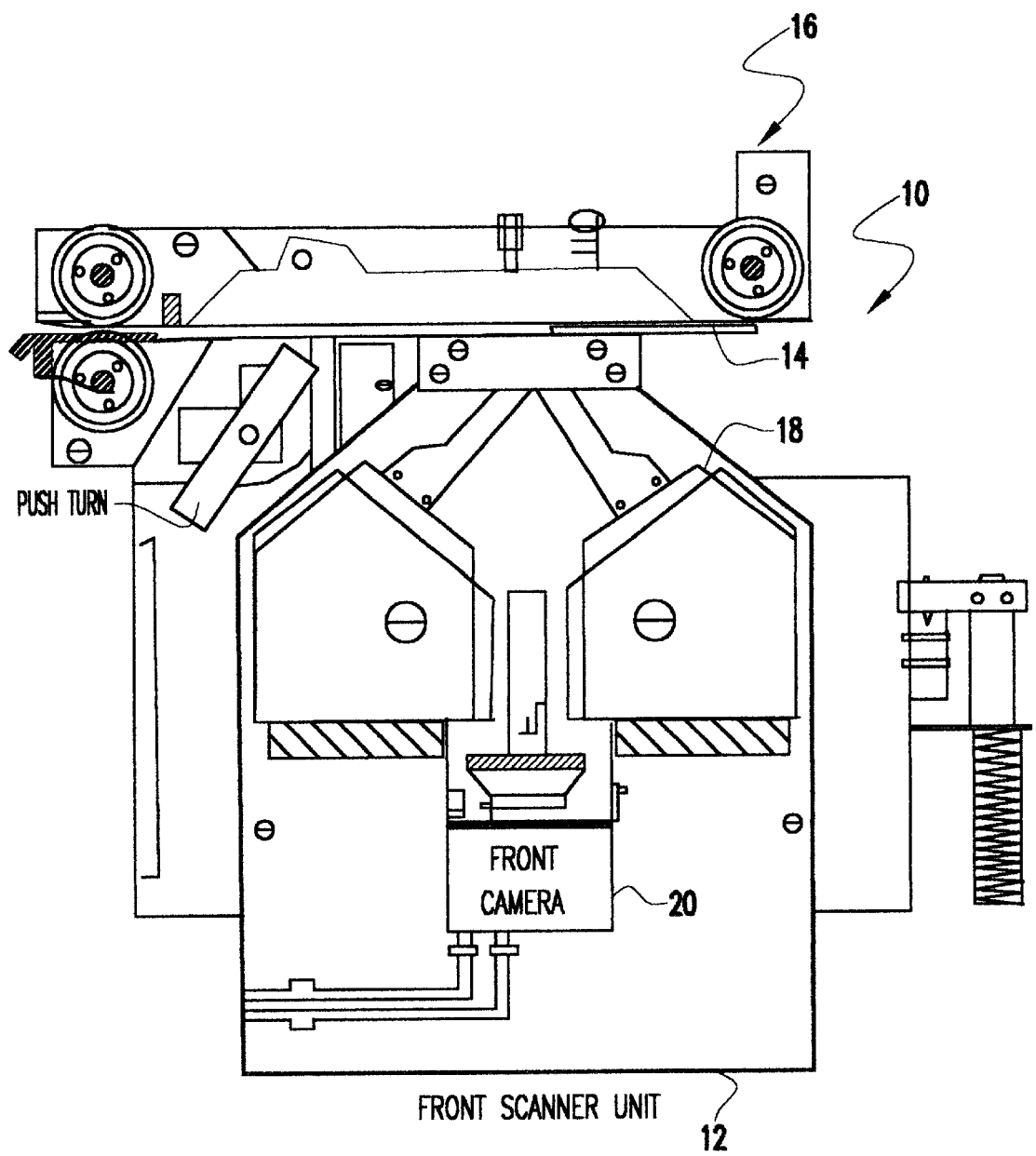
FIG. 1 is a cross-sectional view of an exemplary document scanning apparatus adapted for image capture of personal checks.
Figure 2:
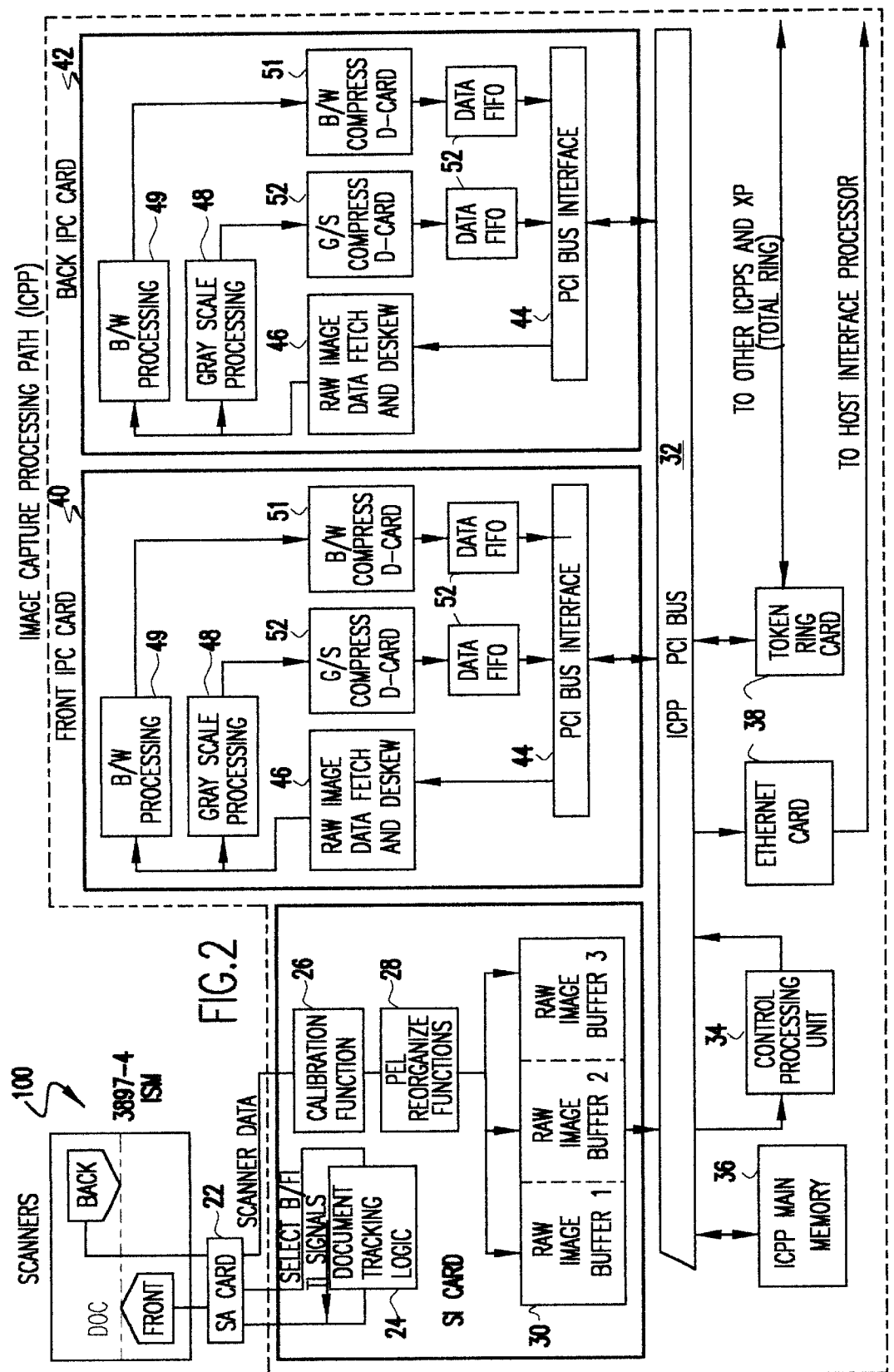
FIG. 2 is a schematic diagram of a controller and data processing arrangement usable with the image capture apparatus of FIG. 1.

Referring now to the drawings, and more particularly to FIGS. 1 and 2, there is shown a scanner of an exemplary form adapted for image capture of personal checks and a controller and data processing arrangement therefor in accordance with a preferred environment of the invention. While scanners performing similar functions are known in the art and those skilled in the art will readily understand the basic principles thereof, since the arrangements shown in FIGS. 1 and 2 are also illustrative of the operation of the invention as well as the preferred environment thereof, no portion of either Figure is admitted to be prior art in regard to the present invention.

The scanner camera 10 depicted in cross-section in FIG. 1 preferably comprises a housing 12 having a document stage 14 over (or under) which the document is passed by a document handling and transport arrangement 16 of any suitable design. The basic function of housing 12 is to maintain the relative positioning of lighting arrangement 18 and camera 20 relative to document stage 14 so that a well-illuminated and well-focussed image of a document can be captured as the document is passed across document stage 14 by transport 16, generally at high speed. Details of the scanner camera are otherwise unimportant to the practice of the invention.

It should be understood that in capturing the image of a personal check (and possibly other types of documents), it is important to capture the image of both sides of the document since, while the amount, payor, date and payee are specified on the front side of the check, the payee's endorsement and various routing information relevant to the clearing of the check will appear on the back side thereof. Security information also generally appears on both sides of the check. Therefore, separate arrangements generally corresponding to that depicted in FIG. 1 are preferably provided for opposite sides of the document, preferably separated along the document path such that the front and back side images are captured in sequence for optimum data collection rate and simplified tracking and identification of images.

This geometry is schematically depicted at 10' of FIG. 2. Scanner adapter card 22 is preferably provided to multiplex image data from the front side and back side scanners under control of document tracking logic 24, details of which are unimportant to the practice of the invention. Scanner data output by the respective scanners is subjected to calibration functions 26 and, since the image sensors are generally high-speed charged coupled devices (CCDs) operating partially in serial and partially in parallel, pixel order is reorganized at 28 and the image data buffered at 30 for transfer to bus 32.

FIG. 2 shows the front and back scanner and a scanner adapter (SA) card. It also shows one of the Image Capture Processor Paths (ICPP). There are four such paths, each located in its own image processor card (IPO). The SA card communicates with the front and back scanner and also communications with each IPC.

At all times, the SA card makes the video data for the front and back scanner available to all four ICPPs. Under program control, at any given time, one of the ICPPs taps the front scanner image and a different ICPP taps the back scanner image. The program control also ensures that a given ICPP first taps the front and then taps the back of the same document.

In an ICPP, the SI card contains three raw image buffers. The buffers are used to store the tapped video information and are used sequentially. Next, the two IPCs for the front and back images, respectively, get the respective images from the raw image buffers of the SI card and process them.

A controller central processing unit 34 and an image capture processing path memory 36 are also connected to bus 32 for control of the scanners and initial image data processing, respectively. An ethernet card and token ring card, collectively indicated at 38, are preferably provided for communicating with a host processor and allowing a potentially large plurality of arrangements as depicted in FIG. 2 to be used simultaneously and in parallel.

Parallel processing arrangements 40, 42 are also preferably provided for processing front and back images of the document, respectively. Raw image data from buffers 30, passes over bus 32 and buffered in bus interface 44. The raw image data is deskewed at 46 to correct for errors in positioning on document stage 14. The deskewed data is then processed into a gray scale image at 48 and compressed, preferably in accordance with the JPEG standard at 50, or compressed into a black and white image at 49 and compressed, preferably in accordance with the ABIC of G4 Modified Modified Read (MMR) standards, and buffered for transfer back to bus 32 and storage in image capture processing path (ICPP) memory 36. ICPP memory 36 can be considered as either a mass storage for compressed image data or as an intermediate storage prior to transfer to such a mass storage from which image data can be selectively retrieved and the desired image reconstructed.

It should be appreciated that the present invention is primarily directed to compression of image data and reconstruction of images in accordance with the JPEG standard, in regard to which a preferred form of the invention will be explained. However, it should also be understood that the invention is completely applicable to any other data compression scheme and whether or not the data represents images. The effects on image data compression and reconstructed image quality are particularly pronounced, however, for images of documents and, as with the JPEG standard, the amount of data compression which is acceptable is limited by the acceptability of the quality of data which can be reconstructed from the compressed data. Nevertheless, at least in regard to document image data and other data which can be coarsely quantized without losing legibility of significant information, the invention provides a substantially increased degree of compression while increasing the quality of reconstructed/decompressed data or image, thus largely avoiding a trade-off between data quality and reduction of data volume.

Before proceeding with further detailed description of the invention, it is useful to review some of the aspects of the JPEG compression standard by which those skilled in the art will be enabled to apply the principles of the invention to other data compression schemes. One of the basic building blocks for JPEG is the Discrete Cosine Transform (DCT). An important aspect of this transform is that it produces uncorrelated coefficients. Decorrelation of the coefficients is very important for compression because each coefficient can then be treated independently without loss of compression efficiency. Another important aspect of the DCT is the ability to quantize the DCT coefficients using visually-weighted quantization values. Since the human visual system response is very dependent on spatial frequency, by decomposing an image into a set of waveforms, each with a particular spatial frequency, it is possible to separate the image structure the eye can see from the image structure that is imperceptible. The DCT thus provides a good approximation to this decomposition to allow truncation or omission of data which does not contribute significantly to the viewer's perception of the fidelity of the image.

In accordance with the JPEG standard, the original monochrome image is first decomposed into blocks of sixty-four pixels in an 8×8 sampling array at an arbitrary resolution which is presumably sufficiently high that visible aliasing is not produced. (Color images are compressed by first decomposing each component into a 8×8 pixel blocks separately. In this regard, a "component" is one of a set of image values, independent of or orthogonal to other components, such as luminance or chrominance which are derived from the image and represent the visual values of pixels thereof. The invention will be described in terms of a single component such as gray-scale or luminance but can be practiced with any number of components, as will be evident to those skilled in the art. The JPEG baseline standard accommodates up to four independent components.) Techniques and hardware are known which can perform a DCT on this quantized image data very rapidly, yeilding sixty-four DCT coefficients.

Many of these DCT coefficients for many blocks will be zero (which do not contribute to the image in any case) or near-zero which can be neglected or omitted when corresponding to spatial frequencies to which the eye is relatively insensitive. Since the human eye is less sensitive to very high and very low spatial frequencies, as part of the JPEG standard, providing DCT coefficients in a so-called zig-zag pattern which approximately corresponds to an increasing sum of spatial frequencies in the horizontal and vertical directions tends to group the DCT coefficients corresponding less important spatial frequencies at the ends of the DCT coefficient data stream, allowing them to be compressed efficiently as a group in many instances.

While the above-described discrete cosine transformation and coding may provide significant data compression for a majority of images encountered in practice, actual reduction in data volume is not guaranteed and the degree of compression theoretically can not be optimal (since the goal of JPEG is to provide the ability to obtain minimal image degradation for the amount of data processing and data volume that can be economically provided), particularly since equal precision for representation of each DCT coefficient would require the same number of bits to be transmitted. However, the JPEG standard allows for the DCT coefficient values to be linearly quantized by sixty-four independent quantization values that are transmitted with the compressed data in a table such as that shown in FIG. 2A, preceding the entropy (e.g. Huffman) codes and a coded representation of one or more image componenets.

For clarity, FIG. 2A is shown right-justified in sixteen columns such that two byte markers extend to the left of the sixteen columns. Each byte is represented by two hexadecimal-coded digits representing two respective nibbles thereof. The first marker in FIG. 2A is "FFD8" representing a start of image (SOI). The second marker is "FFDB" representing a specification of a quantization table (DQT=define quantization table).

This table may have been developed from experiments on the human visual system or from a detailed analysis of the DCT coefficients corresponding to the original image in a manner not important to an understanding of the invention and will be used subsequently to "dequantize" the DCT coefficients during reconstruction of the image. Alternatively, a standard quantization table can be used which is developed empirically or over a relatively large number of images. It is characteristic of the JPEG standard that while the quantization ranges are arbitrary in the sense that they can be freely set to optimize encoding of an image (or previously successful tables used), the same quantization table is used for both encoding and decoding in the interest of fidelity of the reconstructed image to the original image.

The third marker is "FFC0" which is the start of frame (SOF marker that indicates that this is a baseline DCT-based compressed image. The parameters following the the SOF marker indicate the precision (i.e. number of bits per components), the height, width, number of components, etc.

The fourth marker is "FFC4" which represents the beginning of a marker segment specifying one or more Huffman tables of entropy coded image data which are used in decoding the actual image data represented by " . . . " following the fifth marker, a start of scan (SOS) marker. These code format standards are fully discussed in the above-incorporated publication (from which FIG. 2A is reproduced) and further discussion herein is not important to an understanding of the invention sufficient to enable practice of the same by those skilled in the art. The final marker, "FFD9", is the end of image (EOI) marker.

It should be noted from FIG. 2A that two quantization tables are provided following the marker indicating a DQT segment. Up to four quantization tables can be defined and used simultaneously to dequantize and reconstruct the data and the defined quantization tables are identical to the tables used to quantize the original image data.

Figure 2B:
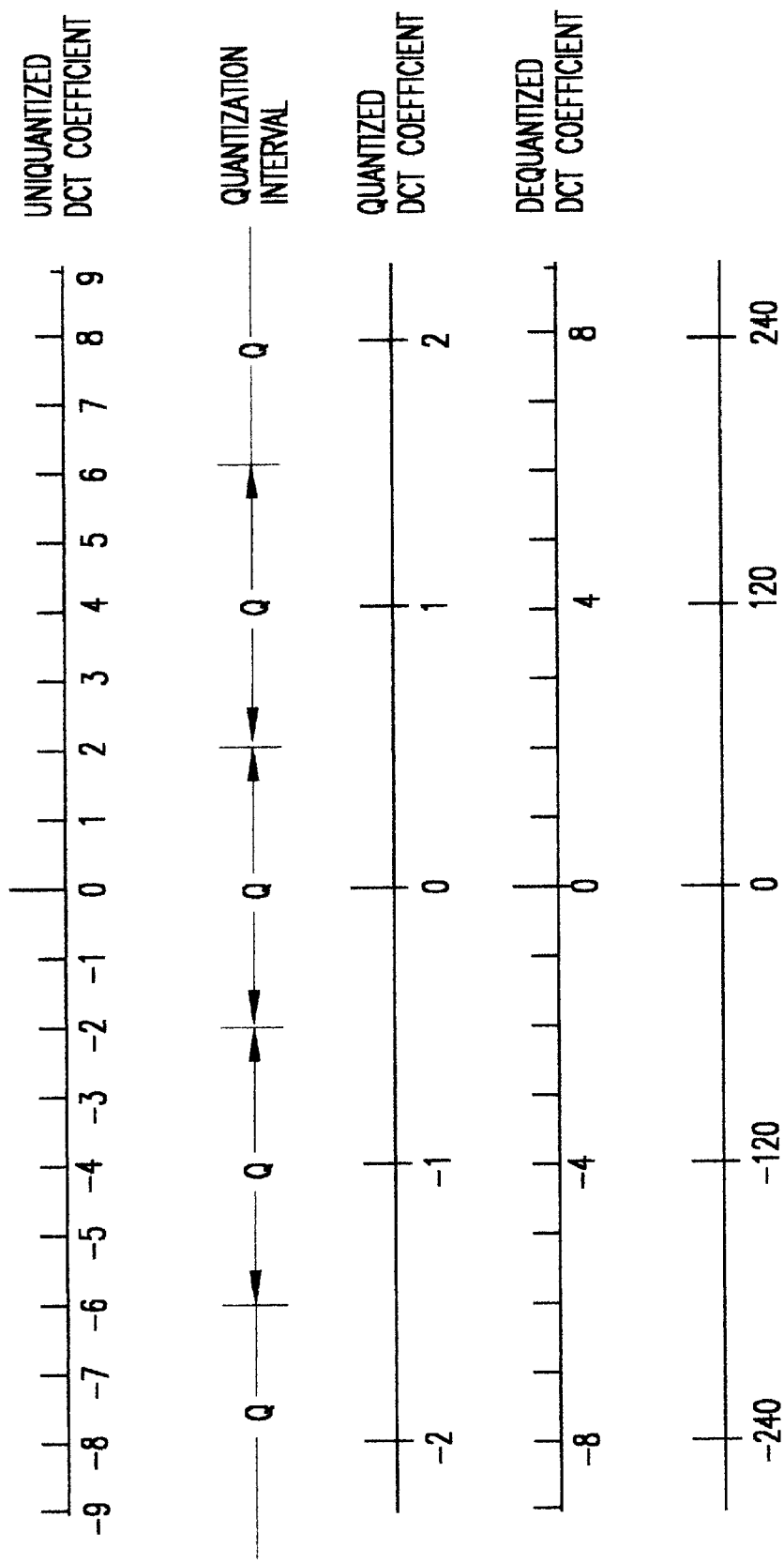
FIG. 2B is a diagram illustrating quantization in accordance with the JPEG standard and illustrating a basic principle of the operation of the invention.

FIG. 2B illustrates a basic principle of the invention in this regard. The first four lines of FIG. 2B are also reproduced from the above-incorporated publication. The fifth line of FIG. 2B illustrates a basic principle of the invention and full compatibility of the invention with the JPEG standard for purposes of decoding the compressed image data and reconstructing an image.

Specifically, the first line of FIG. 2B is a scale of unquantized DCT coefficient values extend, for purposes of this example, from −9 to +9 with a center value of 0. The second line of FIG. 2B illustrates quantization intervals which, for purposes of this illustration, are equal and of value=4. It should be noted that the boundaries of the quantization interval are offset from the center or 0 value by one-half the quantization interval, in accordance with the JPEG standard such that the center quantization interval will be symmetrical about the 0 quantization value and to avoid a bias in image values in the reconstructed image relative to the original image. This process effectively rounds the original unquantized DCT coefficients.

The third line of FIG. 2B shows a scale of quantized DCT coefficients; one corresponding to the center of each quantization interval on the previous line and differing from the scale of unquantized DCT coefficients on the first line by a factor equal to the quantization interval. That is, this process effectively scales the quantized DCT coefficients which have been rounded by the quantization interval as described above. In accordance with the JPEG standard, this scaling (but not the quantizing, which is presumably limited by establishing a suitably small quantization interval) can be reversed upon decoding by substitution of values from the quantization table, as illustrated in the fourth line of FIG. 2B. Note that the scale of the fourth line of FIG. 2B coincides with the scale of the first line and thus corresponds (but for the quantization) to the original image.

However, in accordance with the invention, and as illustrated in the fifth line of FIG. 2B, the values which are substituted for the quantized DCT coefficients of the third line of FIG. 2B are not necessarily constrained to be the values in the quantization table by which the quantization was performed, other than by the convention of the JPEG standard. Moreover, the invention exploits the fact that the standard hardware and/or software used to implement the JPEG standard does so by simple look-up and substitution of values transmitted to it as any of a plurality of quantization tables. That is, while the JPEG standard specifies that the quantization table used for encoding is to be used for decoding, there is no hardware or software constraint at the decoder assuring the identity of data in the quantization tables employed. Therefore, depending on the data in the quantization table used in the decoder, any other quantization scaling can be achieved without modification of any aspect of the decoder, particularly relative to the JPEG standard.

For example, as shown in the fifth line of FIG. 2B and considering the original dynamic range of component values of −8 to +8, the original (but quantized) DCT values of the first line of FIG. 2B could be restored as shown in the fourth line of FIG. 2B or substantially arbitrarily chosen or empirically, mathematically or theoretically established values can be substituted which may greatly expand the dynamic range, as shown in the fifth line of FIG. 2B and which may or may not bear a linear relationship to the original or quantized DCT coefficients; depending entirely on the values of data in the quantization table used in the decoder. Further, since the quantization table values used in the decoder can, in fact, be freely chosen for use in the decoder, unmodified from compliance with the JPEG standard, the inventors have discovered that separation of low contrast features, suppression of substantial amounts of noise and substantial increases in legibility of image features can be achieved consistent with substantial increases in data compression efficiency as the image is encoded in a manner consistent with unmodified operation of a standard, JPEG compliant decoder.

Figure 3:
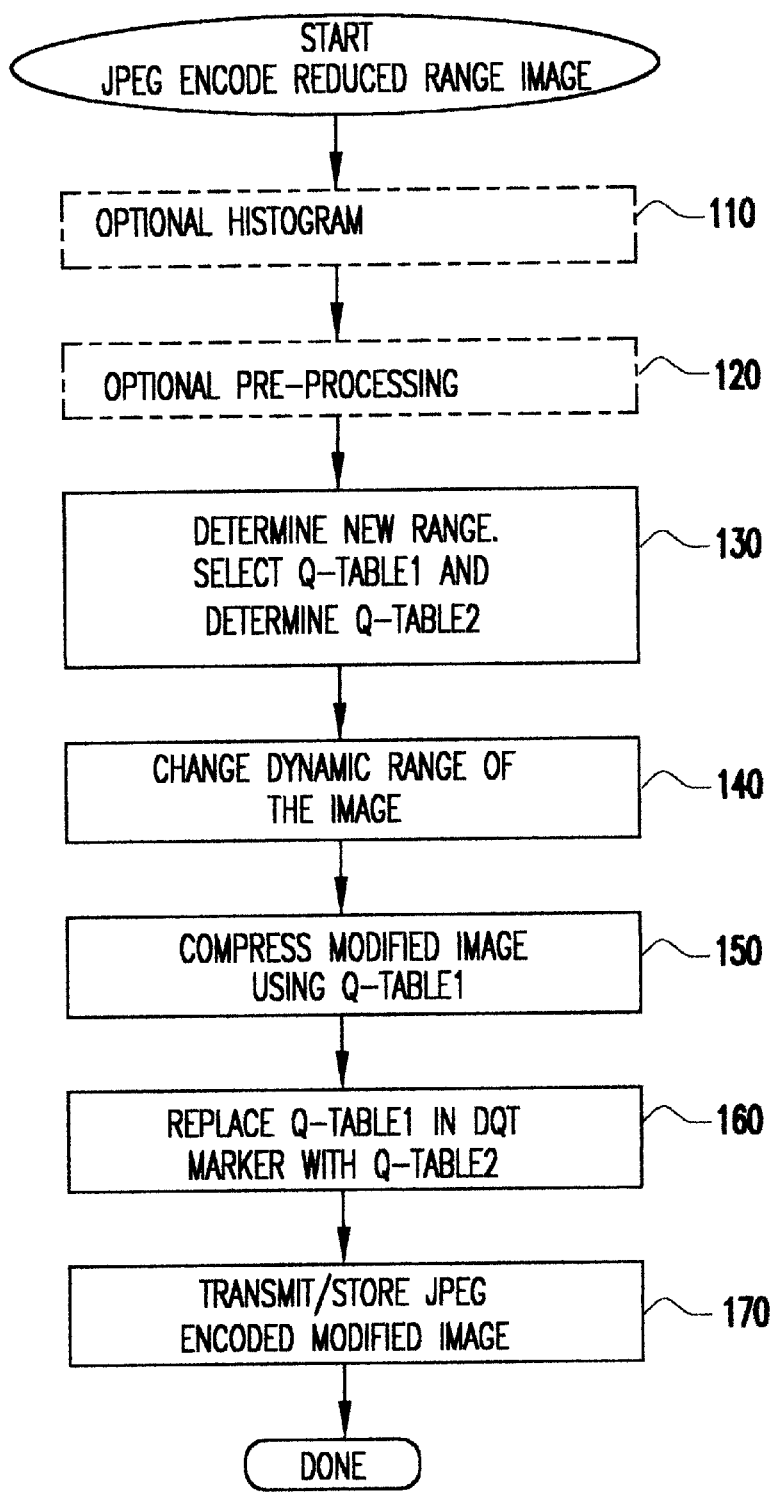
FIG. 3 is a flow chart illustrating an encoding processing of image data in accordance with the invention.

A preferred form of encoder operation is shown in the flow chart of FIG. 3. Again, it should be kept in mind that the following description is provided, for simplicity and clarity, in terms of a single component such as would represent a monochrome or grey-scale image but could be performed using additional components such as would be included to represent color information, as well. It should be understood that each component could, and probably would, have its own independent range reduction and expansion. As noted above, up to four quantization tables can be simultaneously active and four components can be interleaved after a start-of-scan (SOS) marker.

The principal function of the methodology depicted in FIG. 3 is to encode a reduced dynamic range image. However, additional and optional image analysis and processing can be included as a perfecting feature of the invention. Specifically, step 110 is directed to development of a histogram of the relative numbers or frequency of occurrence of image values and is optional for any given document but it is desirable to at least perform such an analysis for a document or a plurality of documents representative of at least a class of documents. The histogram thus developed may or may not be suitable for other classes of documents. However, many classes of documents may, in fact, share numerous similarities of such histograms and there is a substantial likelihood that different classes of documents having similar general appearances can be handled well, if not optimally, based on an analysis of a single class of documents.

Figure 3A:
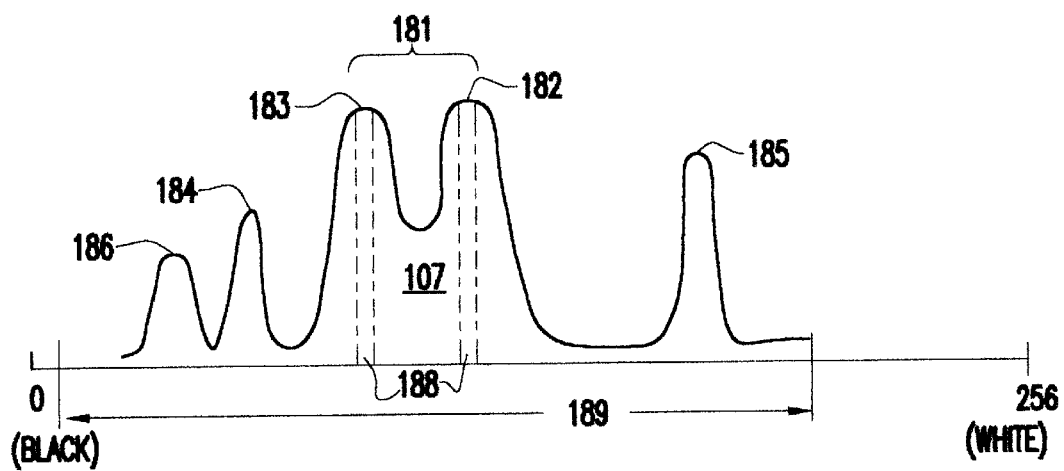
FIG. 3A is an exemplary histogram of an image showing peaks and valleys of image values.

In general, a document can be expected to have a histogram including one or more large peaks at or clustered about a given component value corresponding to a background and which may include a low-contrast pattern. One or more lesser histogram peaks will also generally be produced, corresponding to indicia having different image values (e.g. printed text, handwritten indicia, letterhead, security indicia and the like). The range of image values represented by these peaks represent the range of image values which may be of interest and, hence, the dynamic range of the image which may be expected to contain information of interest. FIG. 3A illustrates an exemplary histogram that might be expected to be derived from processing images of the front and/or rear of an executed and negotiated personal check (in general, the histograms will be substantially different between the front and back sides of a personal check; the back side generally presenting lower contrast features and hence more closely grouped peaks).

In this exemplary histogram, connected peaks 181, comprising sub-peaks 182 and 183 generally represent background (and which may be common to the front and back sides of the check) while peak 184 may represent handwritten indicia, peak 185 may represent security indicia and peak 18G may represent high-contrast printing and machine readable indicia. As a convention, the horizontal axis is indexed from 0 (black) to 255 (white) for a monochrome component. It should be noted that the histogram does not necessarily reach zero between peaks, representing both noise and variation in the values captured during scanning. It should also be noted that the peaks do not extend over the entire dynamic range but that non-zero image histogram values may exist over the entire dynamic range.

Step 120 of FIG. 3 indicates optional preprocessing of the image data such as filtering, edge sharpening or signal-to-noise separation techniques which can be advantageously used to enhance image compression, reduce noise and improve image legibility. It should, however, be understood that the invention provides a substantial degree of such enhancements even in the absence of such preprocessing and a synergistic effect in regard to these meritorious effects when preprocessing is employed, as will become more clear from the discussion of the invention below.

Figure 6A:
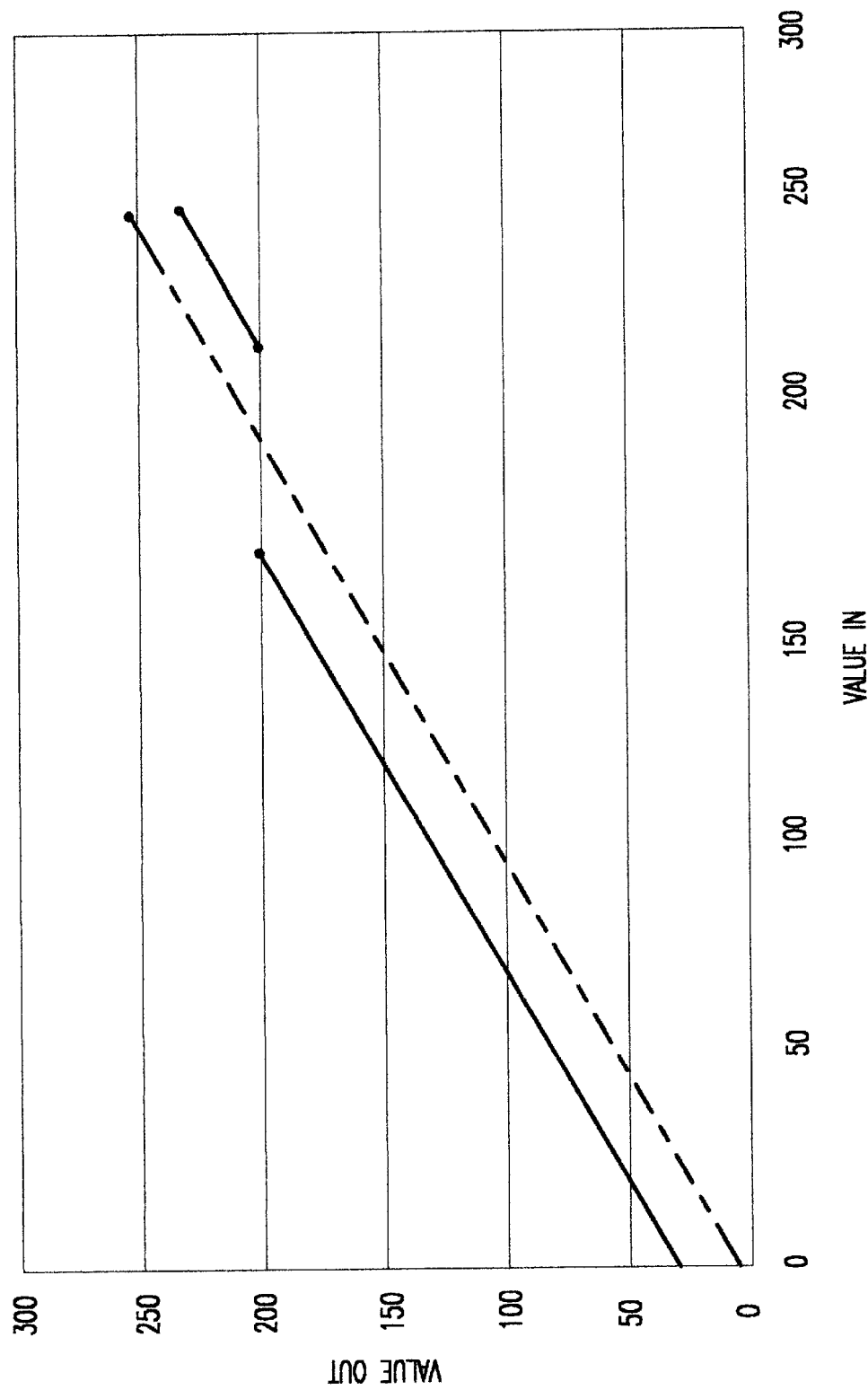
FIG. 6A is a graph illustrating symmetric coring to reduce the output range.

An example of preprocessing in accordance with a histogram (however derived but assumed to be approximately representative of the image) would be to remap all values of the background peak(s) that are more extreme than the peak back to approximately the central value of the peak(s). This has the effect of moving data between the peaks (e.g. in region 187) toward the peaks (e.g. within 187) and increasing the definition of the peaks while suppressing many image values which may represent noise. Similar processing can be performed in regard to any or all other peaks. Further, in the course of such remapping, it has been found desirable to place the background peak (or to cluster the background peaks) near image value 200 (for a relatively light background) in order to provide image values representing lighter features while assuming that all other features of interest will be darker than the background. This process is referred to as coring since data between peaks is substantially removed. An alternate depiction of coring is shown in FIG. 6A in which little if any dynamic range is allocated to a region where no information of interest is expected.

Figure 6B:
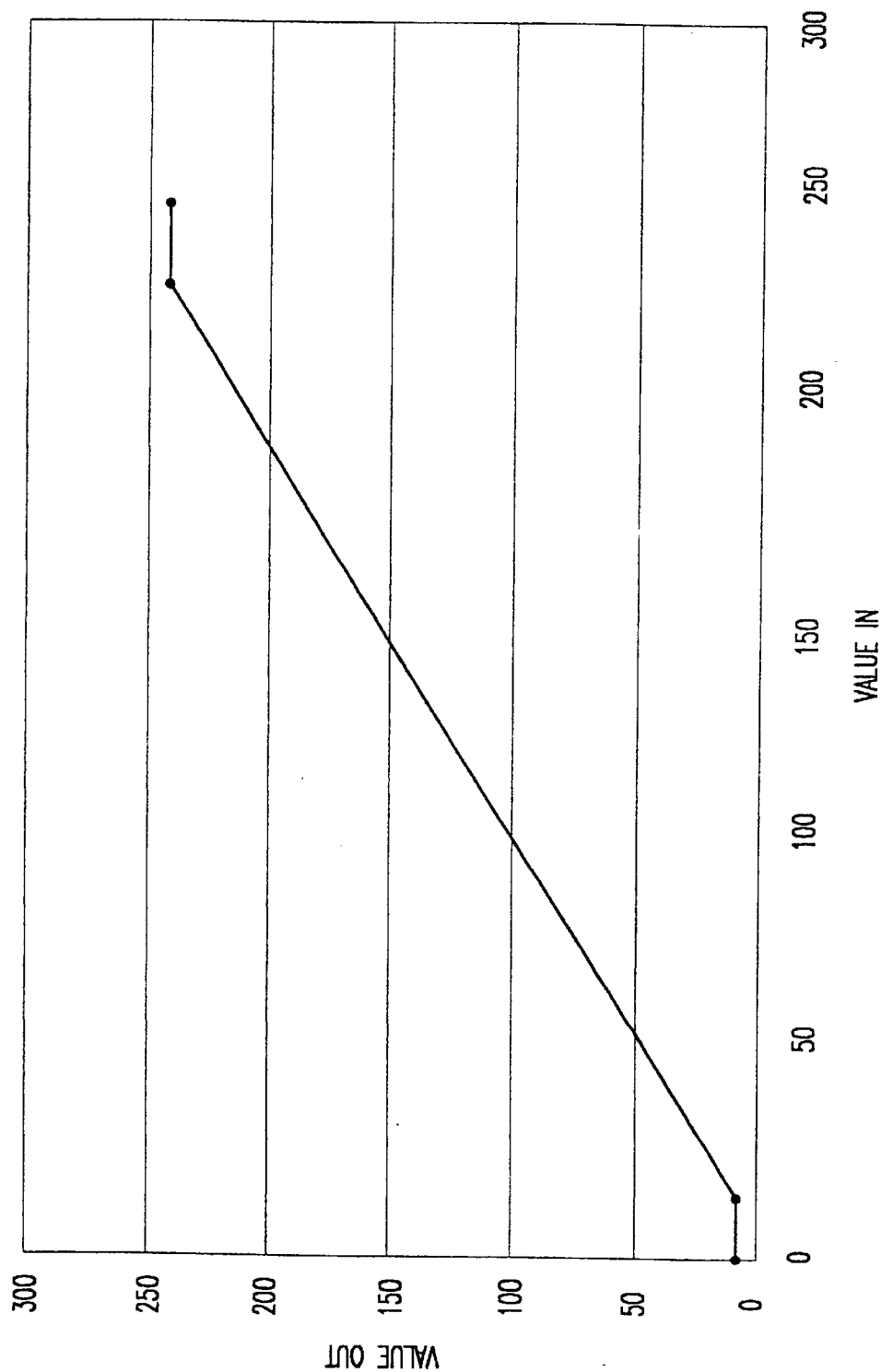
FIG. 6B is a graph illustrating reducing the output range by clipping extreme values.

At the ends of the nominal dynamic range of the apparent information content of the image (e.g. outside range 189) further noise can be removed by clipping as discussed in European Patent application EP 188193, hereby fully incorporated by reference. Further, in combination with clipping and coring, the data can be remapped to further reduce the dynamic range. An alternative depiction of clipping is shown in FIG. 6B showing little if any of the dynamic range allocated to the regions beyond the dynamic range (from 15 to 240) of the data of interest.

It should be appreciated at this point that while noise is reduced and preservation of detail provided by the above preprocessing, the degree of compression is a function of the dynamic range which will be represented as values in the coded data as well as the quantization values used.

Figure 3B:
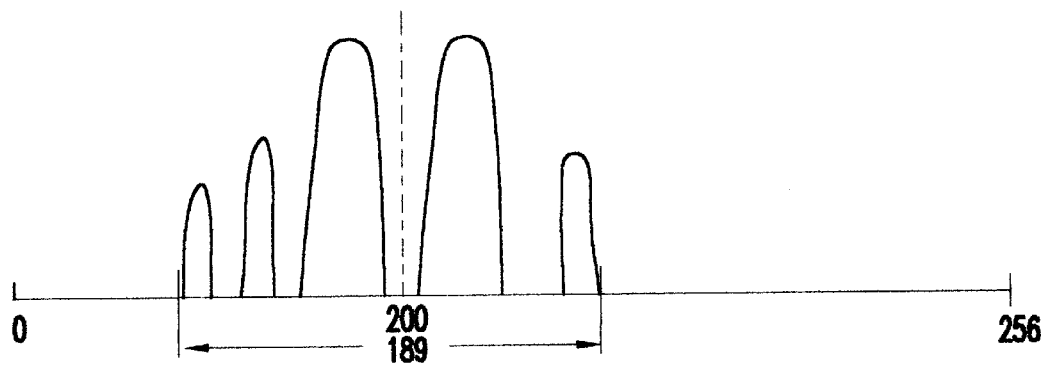
FIG. 3B is an exemplary histogram showing clipping of the image values to the region of interset.

This can be accomplished without thresholding, which is a difficult and error-prone process that may increase effective noise content. However, if preprocessing is performed, the peaks are less noisy and more clearly defined (thus increasing the potential degree of data compression). Thus, after preprocessing, remapping the histogram peaks, the data represented in the histogram of FIG. 3A may appear remapped as shown in FIG. 3B with the dynamic range 189' significantly reduced.

Step 130 depicts setting of the dynamic range which will be used in the coding of the image. The reduction of dynamic range will generally be proportional to the degree of data compression to be achieved consistent with (e.g. limited by) maintaining desired image detail. Within these constraints, the dynamic range can be freely chosen. It follows that since the number of image values expected to contain information are well-segregated and mapped into narrow ranges, the degree of data compression for documents or other data which can be coarsely quantized, can be substantial without loss of information of interest. This is depicted in an alternative manner in FIG. 6C by a reduction of the slope of the line indicating correspondence of the image values and the data values within the dynamic range.

The "new" range may be based on a histogram of each image or collected over a plurality of images or simply assumed, with or without preprocessing/remapping as discussed above. Once the "new" dynamic range is established. This dynamic range can be further reduced to minimize compressed image size consistent with legibility requirements.

In experiments, sampling at 160 pixels per inch and using only five quantization levels, a 51:1 (=256/5) range reduction ratio, good legibility of the reconstructed image was realized even though the number of intensities was reduced below that currently considered to be minimally acceptable. Background images were rendered with strong contours (e.g. increased contrast) but the finest print presented remained legible consistent with the priority of the experiment. Other processing could clearly refine the overall acceptability and appearance of the image.

This changed dynamic range is then represented in a first quantization table (hereinafter Q table1) from which a second quantization table (hereinafter Q table2) to recover or expand the dynamic range can be computed. In this regard, it should be noted that either dynamic range 189 or 189' can be expanded to substantially the full dynamic range of 0 to 256. Then, the remapped image data representing the original image are encoded using Q table1 as shown at 150 in the normal JPEG compliant manner, following which Q table2 is substituted for Q table1 in the coded data as shown at 160 and stored or transmitted as depicted at 170.

Figure 6D:
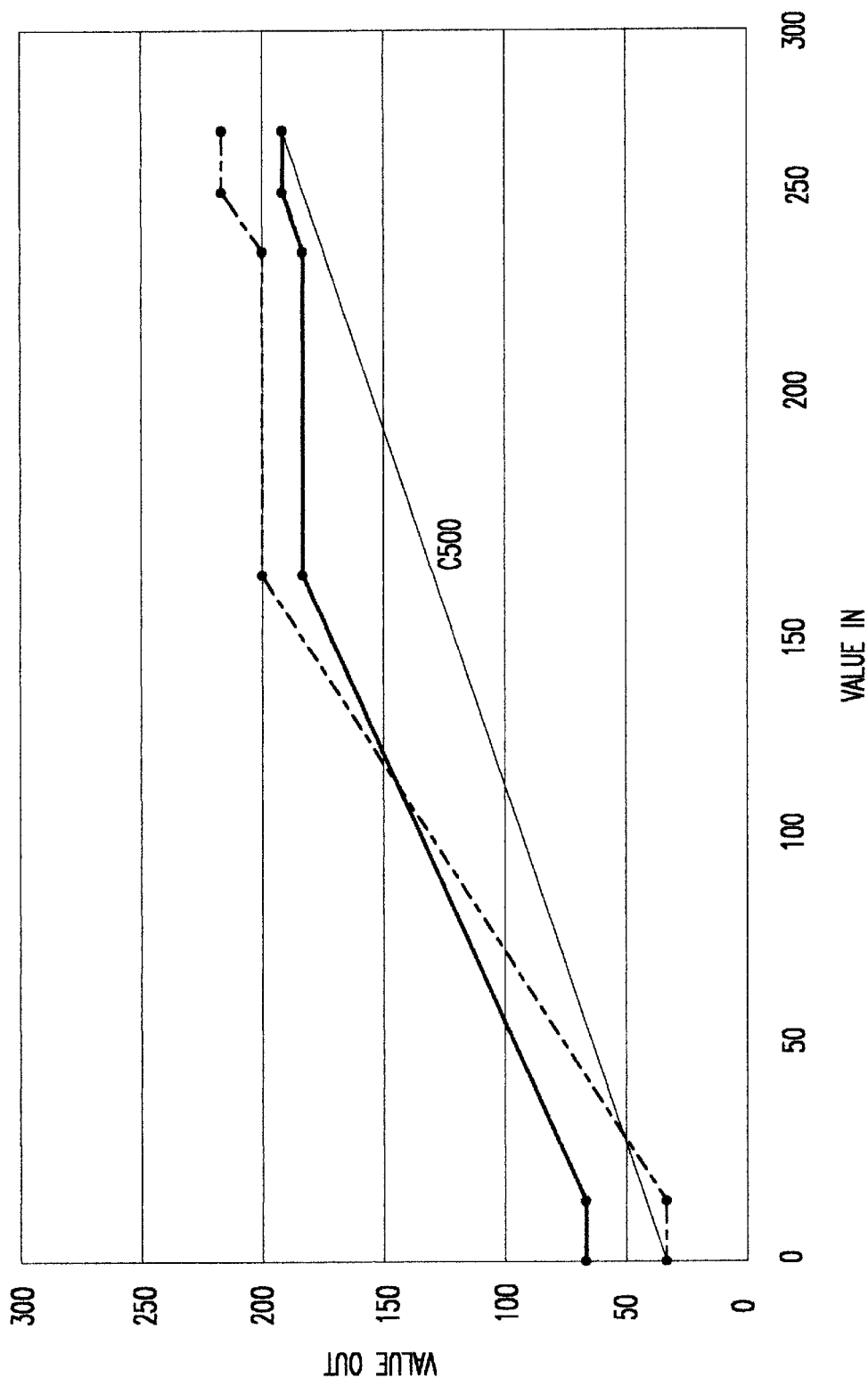
FIG. 6D is a graph showing reduction of the output range by clipping and coring and by clipping, coring and dynamic range reduction.

FIG. 6D shows the combined results of clipping and coring and the combination of clipping, coring and scaling of dynamic range. The overall effect of clipping allows more accurate representation of the signal within the available dynamic range by allowing the dynamic range of the signal of interest to be eventually expanded to a greater range. Coring allows greater slope/sensitivity between peaks where distinction of similarly valued data is of importance. Scaling of the dynamic range allows greater compression of data volume and, in combination with clipping and coring provides reduced overall and maximum variance form the values of interest, as depicted by line 500, with the result of further reducing noise consistent with potentially increased image fidelity.

Figure 3C:
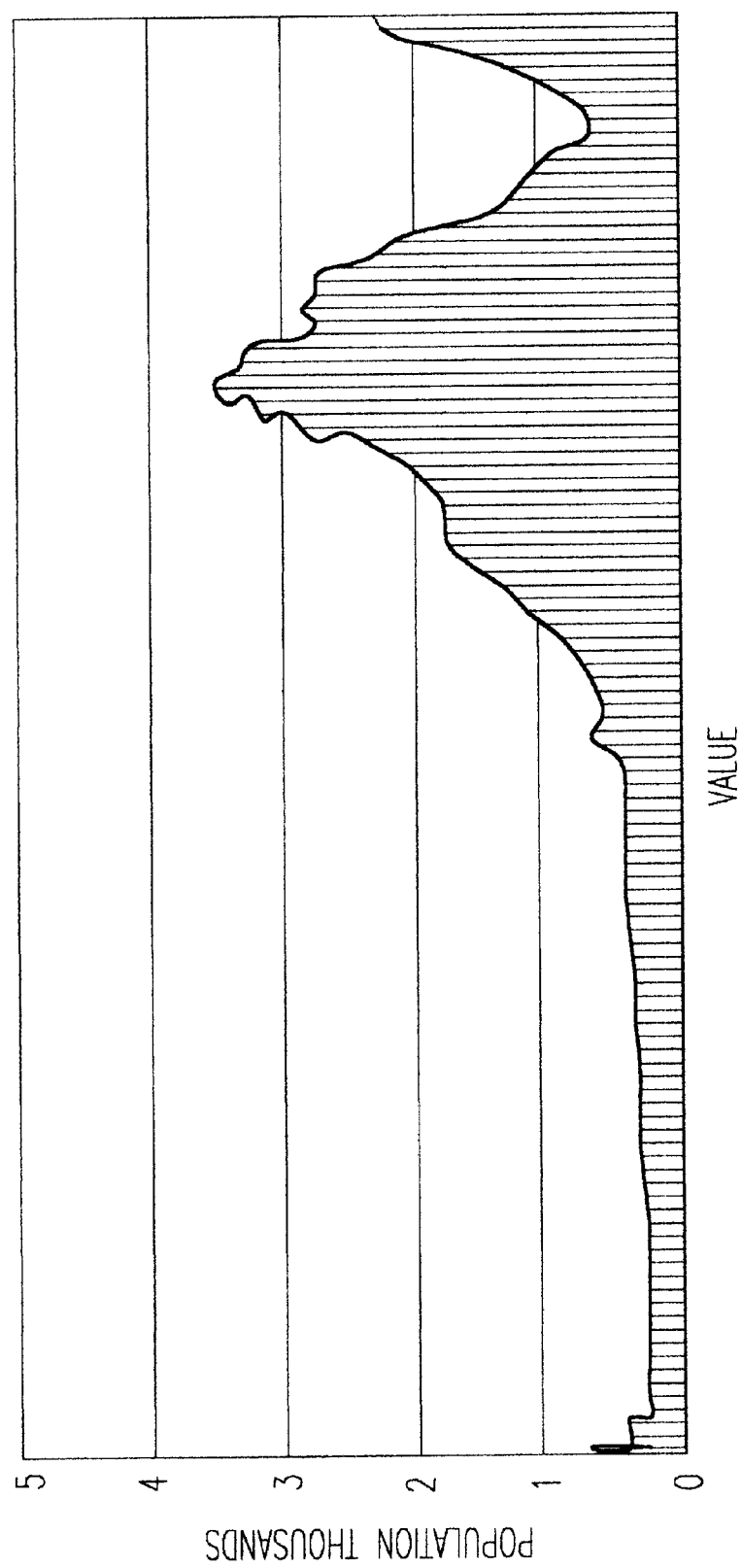
FIG. 3C is a histogram of the image of a front of a check.
Figure 3D:
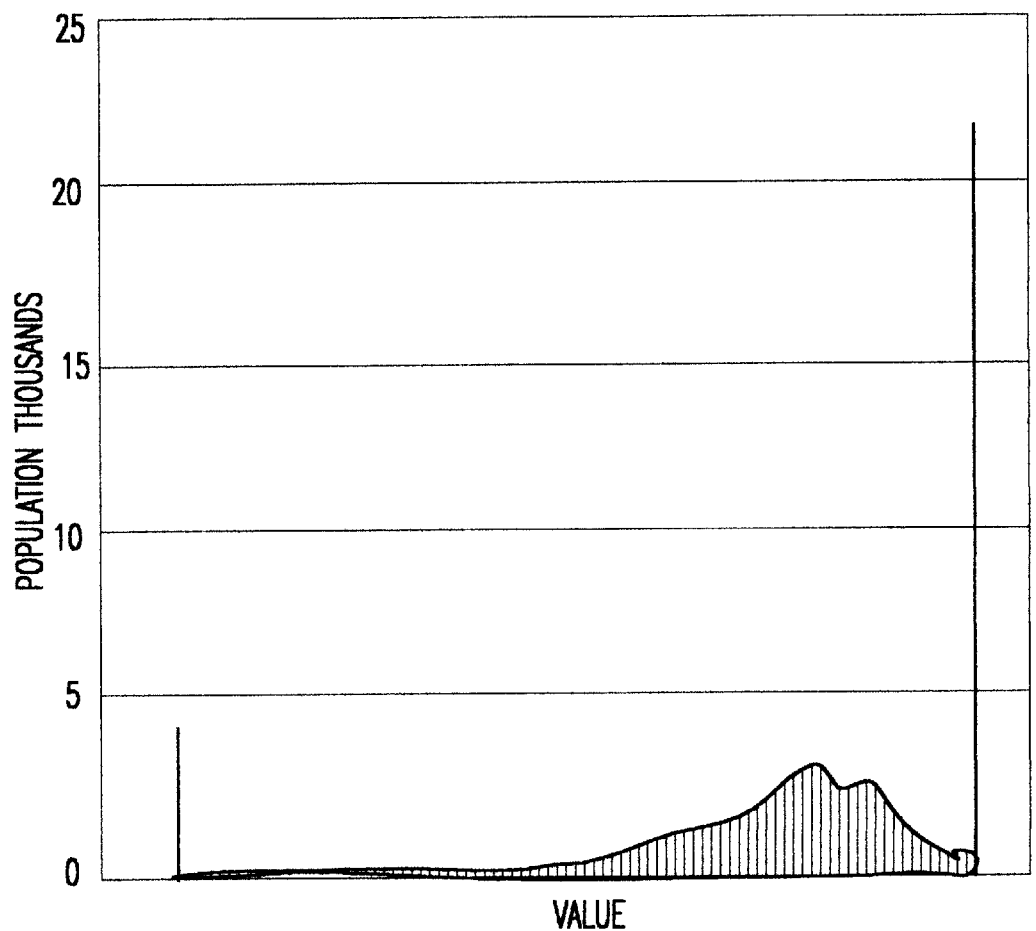
FIG. 3D is a histogram of the same image after clipping the extreme values.
Figure 3E:
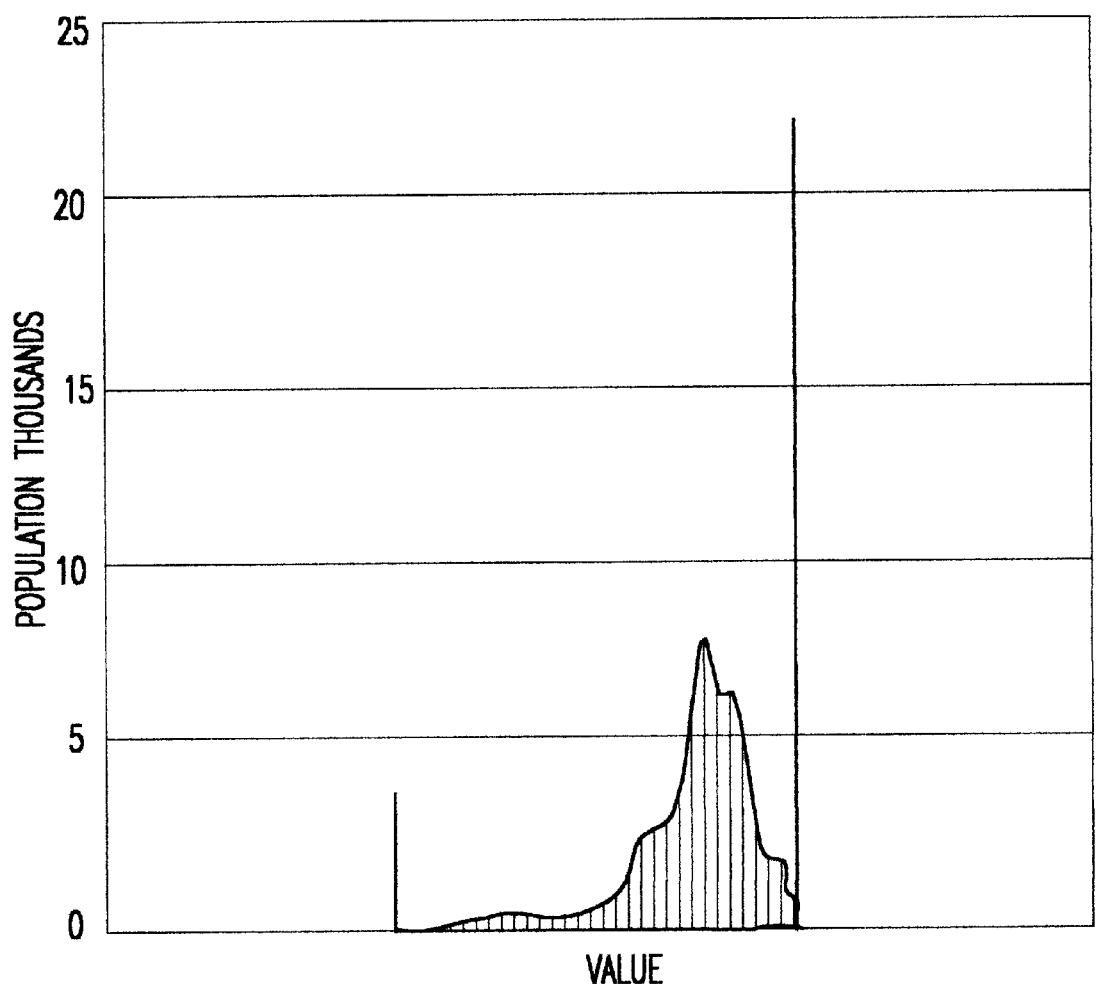
FIG. 3E is a histogram of the clipped image of FIG. 3D after a 2:1 dynamic range reduction.
Figure 3F:
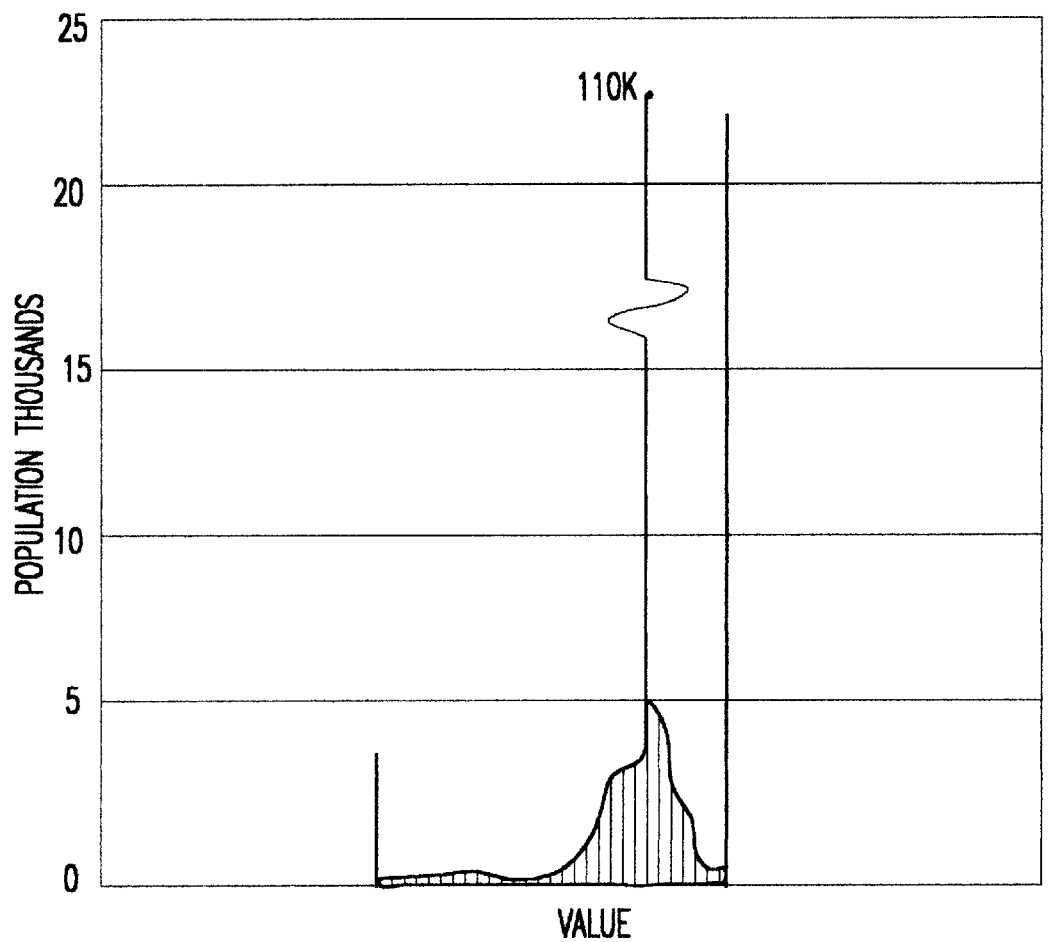
FIG. 3F is a histogram of the image with coring of the background peak in addition to clipping and dynamic range reduction.

FIGS. 3D–3F show actual histograms of the front of a check containing a background image after different stages of pre-processing to reduce the dynamic range. FIG. 3C is a histogram of the original image. FIG. 3D represents the same image after the image was clipped to a range of 226 from 15 to 240. FIG. 3E srepresents the clipped image with its dynamic range scaled down an additional factor of two to a new range of 133 from 72 to 184, FIG. 3F shows a histogram of the clipped and scaled image after coring plus and minus ten values in the background for a final range of 93 from 82 to 174. (The new peak value of one hundred ten thousand has been reduced for purposes of this illustration.)

Using the JPEG example quantization tables and Huffman codes found in Annex K of the JPEG standard, the original image (FIG. 3C) is compressed to 15,650 bytes. After clipping, the compressed size decreased slightly to 15,513 bytes (FIG. 3D). The dynamic range scaling further reduces compressed image size to 10,397 bytes (FIG. 3E) and coring (FIG. 3F) further reduced the compressed data size to 8,802 bytes or roughly a 2:1 reduction in data size.

Figure 4:
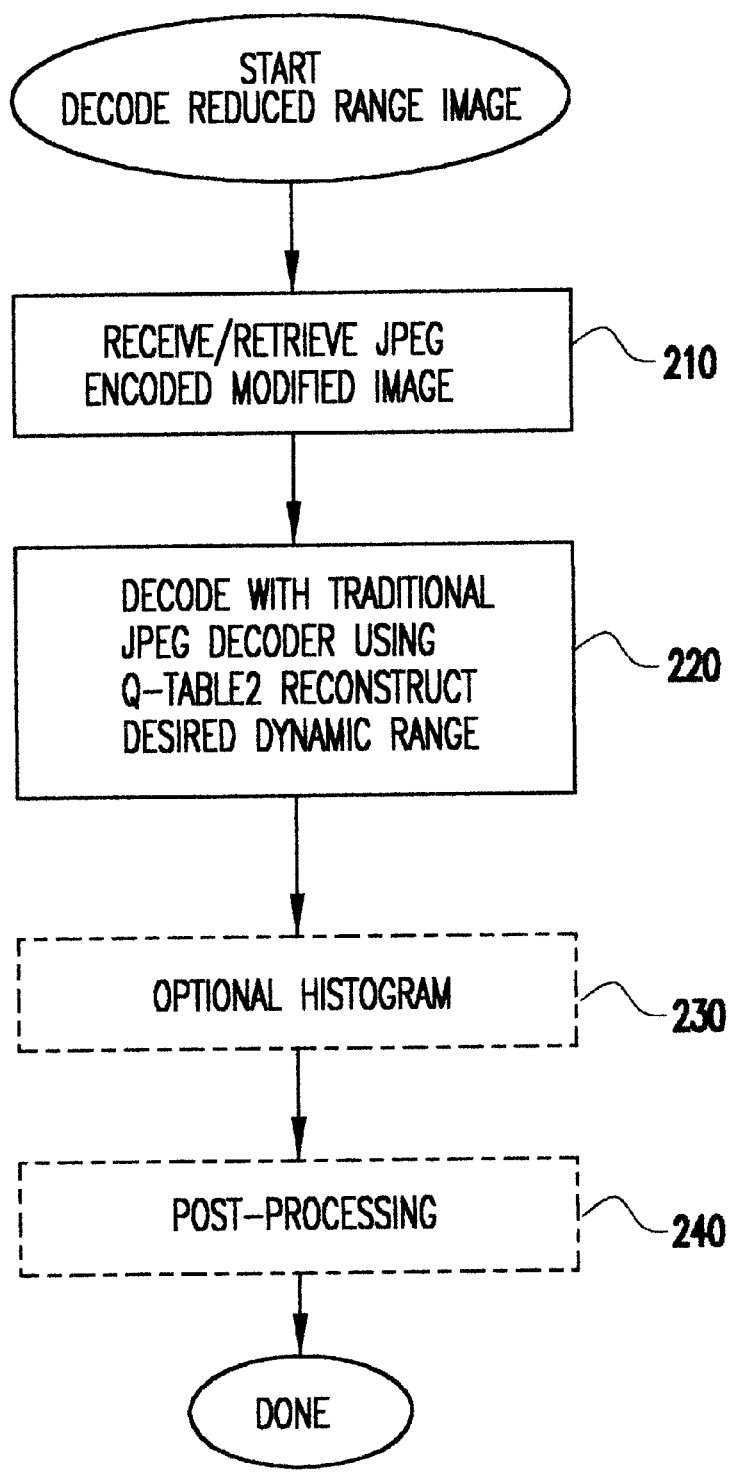
FIG. 4 is a flow chart illustrating a decoding process in accordance with the invention.

Referring now to FIG. 4, decoding the image coded as discussed above will now be discussed. As shown at 210, the coded image is retrieved or received. However, it will be recalled that the quantization table specifying how the decoding will be performed is now Q table2, computed and substituted to restore or enhance the original dynamic range. Then the decoding is performed to reconstruct a restored or enhanced image from severely compressed data. Those skilled in the art will recognize that steps 210 and 220 represent normal decoding in accordance with the JPEG standard, unmodified, and are equally representative of any other data compression scheme including quantization. The JPEG standard specifies that the reconstructed values in the decoder are integers in the range of 0 to $2^P-1$ where P is the precision of the image component (s). It does not specify whether the conversion to integers is by rounding or truncation. If the Q table1 of the encoder were used and the range subsequently expanded, this quantization to integer output values would introduce extra unnecessary errors, particularly when the range reduction is severe to obtain extreme compression.

In addition, the JPEG standard specifies that any reconstructed values outside the allowed range are expected to be clamped at the expected boundary. Since human observers tend to prefer high contrast images of documents, this internal clamping can be used to create a higher contrast image if Q table2 is designed to overcompensate for the original image reduction. In this process some edge quantization noise may be clamped away. Optional analysis 230 and post-processing 24 can be applied, as desired, for example, to remap background peaks to different image values or separations. The optional histogram and post-processing may be used to restore the original mean, average contrast or some desired mean and/or range such as the original range.

Figure 5:
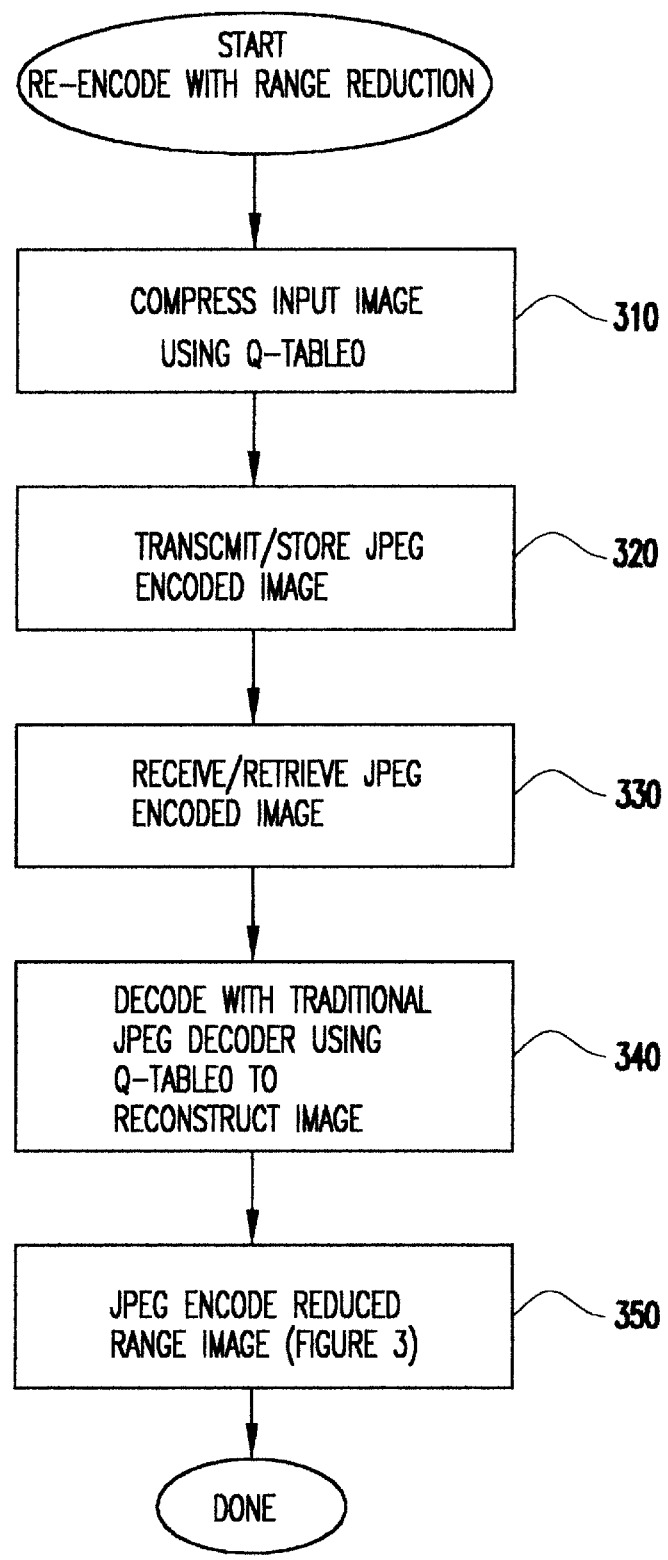
FIG. 5 is a flow chart illustrating a preferred form of reducing the compressed size of of images by re-encoding with dynamic range reduction.

As shown in FIG. 5, the invention is also applicable to JPEG encoded data once reconstructed in accordance with the JPEG standard. That is, image data can be compressed and coded in accordance with an appropriate Q table0 (distinct from Q table1 and Q table2) as shown at 310, stored and/or transmitted (320), received/retrieved (330) and then decoded using the same Q table0, completely in accordance with JPEG techniques prior to applying the compression of FIG. 3. Therefore, the invention is fully applicable to existing repositories of image data for further compression and reduction of the storage costs thereof.

Figure 7:
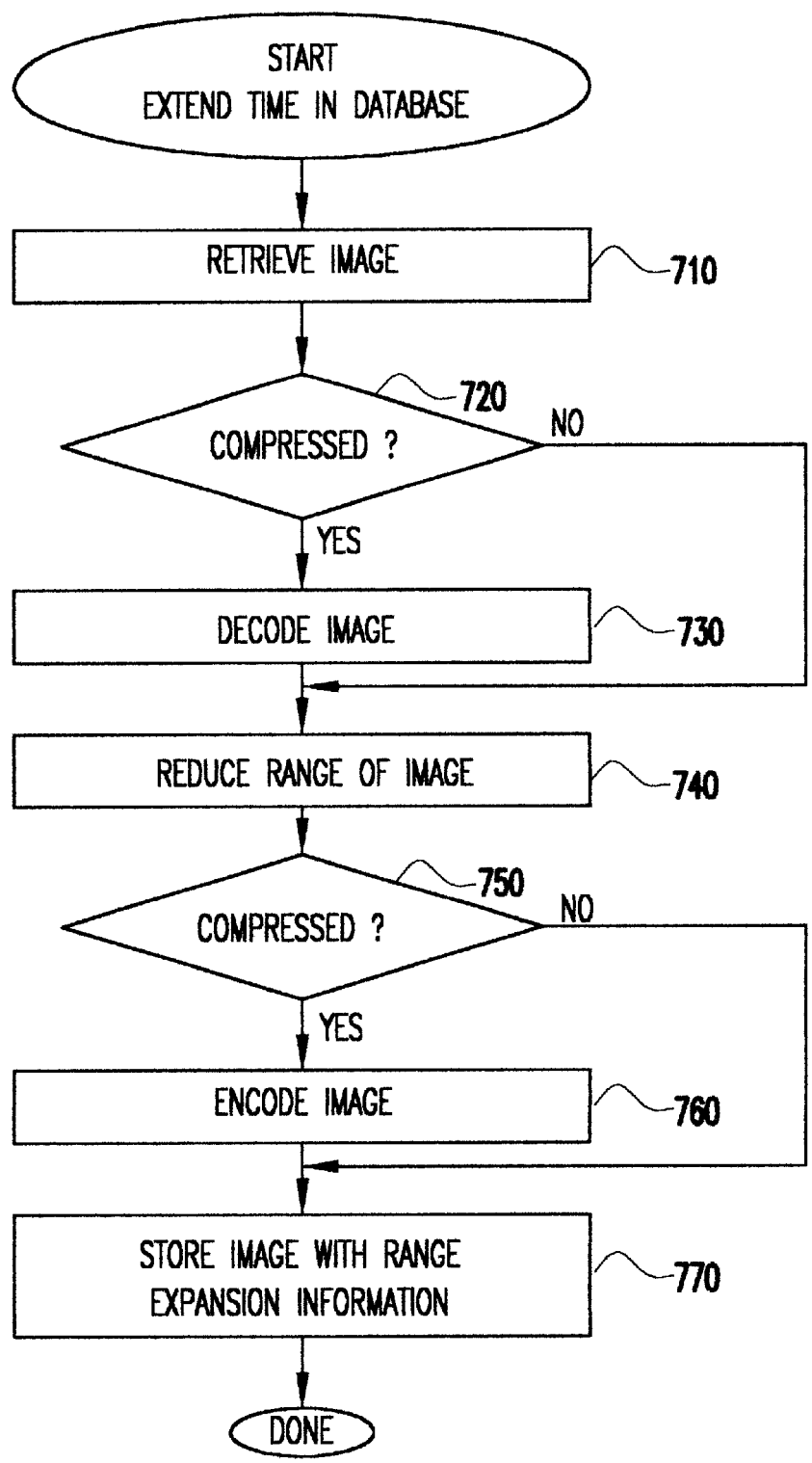
FIG. 7 is a flow graph illustrating extending the time of images in a data base by reducing the range of the image.

FIG. 7 is a flow chart showing a preferred embodiment for extending the time an image may be kept in a database. The image is retrieved 710 and, if compressed 720 with any compression technique including lossless coding, it is decompressed/decoded 730 by an appropriate decoder. The optional histogram and pre-processing (shown in FIG. 3) are not illustrated in FIG. 7 but may be included if desired. In block 740, the range of the image is reduced, If, as determined at 750, the reduced range image is to be compressed, (possibly with a different compression technique), it is encoded 760. Then the reduced range image is (with or without compression) is stored with range expansion information 770. For the JPEG DCT-based compression, this range expansion information can be in the form of substituted, scaled Q table2. For other applications, it may be in the form of a JPEG-LS output remapping table.

Figure 8:
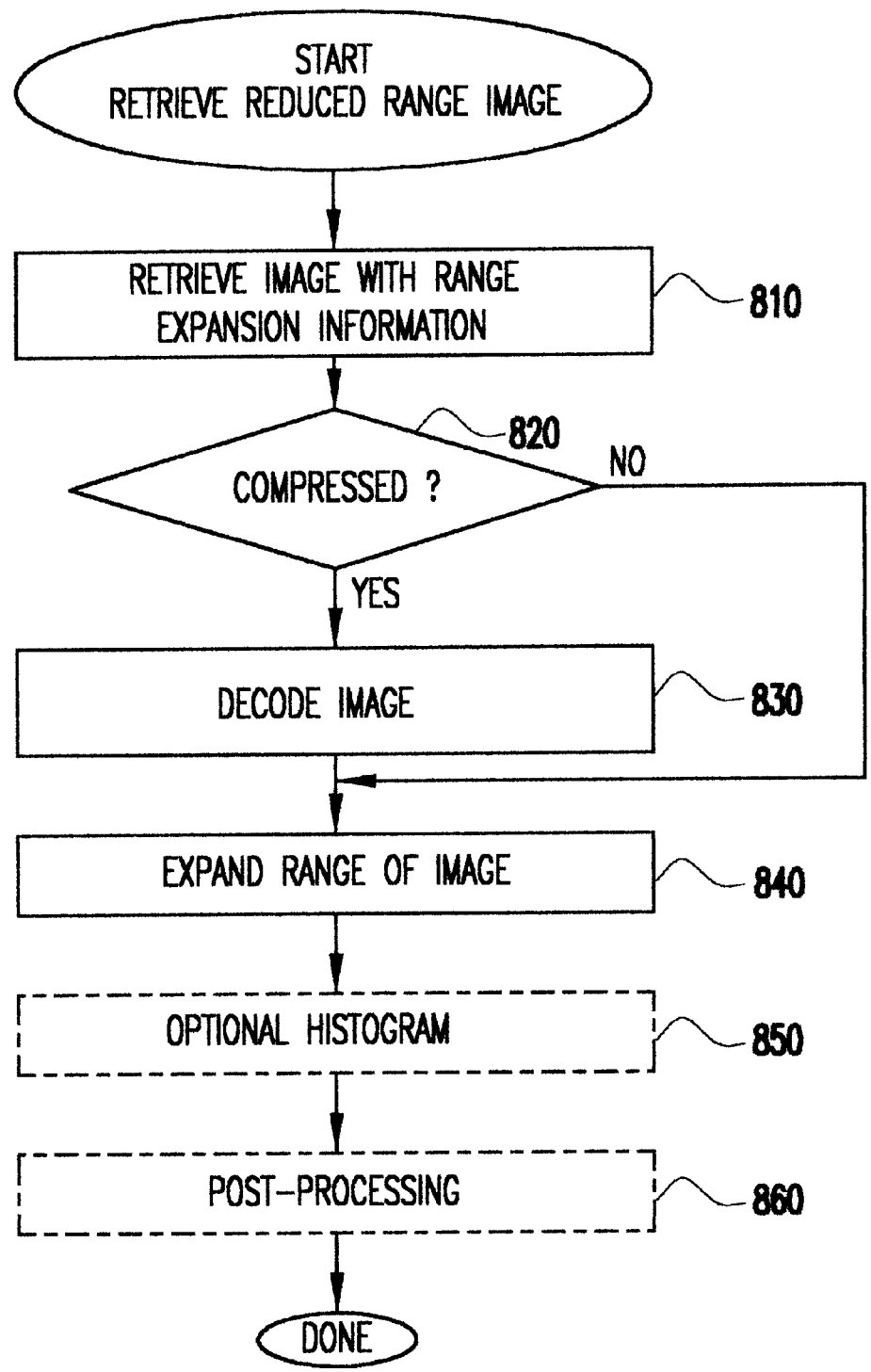
FIG. 8 is a flow graph illustrating retrieval of a reduced range image.

FIG. 8 is a flow chart showing use of this range-reduced image. The image with the range expansion information is retrieved 810. If it was compressed 820, it is decoded 830 with the corresponding decoder. The range of the image is then expanded (if not already done at 830) as indicated at 840. Optional histogram 850 and post-processing 860 stages are shown following range expansion but could precede it.

In view of the foregoing and with reference to FIGS. 6A–6D, the invention provides substantial additional data volume compression of images of documents or other data which can be coarsely quantized without significant loss and further reduces data volume to be transmitted or stored. Substantial further enhancements and performance improvements are provided by preprocessing and/or post-processing to remap image values in any desired manner.

While the invention has been described in terms of a single preferred embodiment, those skilled in the art will recognize that the invention can be practiced with modification within the spirit and scope of the appended claims.

We claim:

1. A method of compressing captured data comprising steps of selecting a first quantization table, reducing the dynamic range of captured data, forming data of reduced dynamic range, compressing said data of said reduced dynamic range with said first quantization table forming compressed data, and storing or transmitting said compressed data together with a second quantization table representing a dynamic range other than said reduced dynamic range for expansion of said compressed data having a reduced dynamic range, when decoded.

2. A method as recited in claim 1, including the further step of determining a nominal dynamic range for data of interest.

3. A method as recited in claim 1, further including a step of remapping image values.

4. A method as recited in claim 1, wherein said step of reducing dynamic range of said data includes at least one of clipping and coring.

5. A method as recited in claim 1, wherein said step of remapping image values of said data includes at least one of clipping, coring and dynamic 2 range reduction.

6. A method as recited in claim 1, including the further step of decoding said compressed data using said second quantization table.

7. A method as recited in claim 6, wherein said decoding step is performed using a decoder implementing the JPEG standard.

8. An apparatus for compressing captured data comprising means for selecting a first quantization table, means for reducing the dynamic range of captured data, forming data of reduced dynamic range, means for compressing said data of said reduced dynamic range with said first quantization table forming compressed data, and means for storing or transmitting said compressed data together with a second quantization table representing a dynamic range other than said reduced dynamic range for expansion of said compressed data having a reduced dynamic range, when decoded.

9. An apparatus as recited in claim 8, further including means for determining a nominal dynamic range for data of interest.

10. An apparatus as recited in claim 8, further including means for remapping image values.

11. An apparatus as recited in claim 8, wherein said means for reducing dynamic range of said data includes means for at least one of clipping and coring.

12. An apparatus as recited in claim 8, wherein said means for remapping image values of said data includes means for at least one of clipping, coring and dynamic range reduction.

13. An apparatus as recited in claim 8, further including means for decoding said compressed data using said second quantization table.

14. A method as recited in claim 13, wherein said means for decoding implements the JPEG standard.

* * * * *